United States Patent [19]
Fukada

[11] Patent Number: 5,839,799
[45] Date of Patent: Nov. 24, 1998

[54] BEHAVIOR CONTROL DEVICE OF VEHICLE BASED UPON MONITORING MOVEMENT OF REAR WHEELS

[75] Inventor: Yoshiki Fukada, Susono, Japan

[73] Assignee: Toyota Jidosha Kabushiki Kaisha, Toyota, Japan

[21] Appl. No.: 725,317

[22] Filed: Oct. 2, 1996

[30] Foreign Application Priority Data

Oct. 6, 1995 [JP] Japan ..................................... 7-286417

[51] Int. Cl.$^6$ ........................................................ B60T 8/32
[52] U.S. Cl. ............................................................ 303/146
[58] Field of Search .................................... 303/140, 146, 303/147; 180/197; 364/426.01, 426.03, 426.016, 426.018, 426.019, 426.027, 426.028, 426.036, 426.037

[56] References Cited

U.S. PATENT DOCUMENTS

| | | |
|---|---|---|
| 5,079,708 | 1/1992 | Brown . |
| 5,640,324 | 6/1997 | Inagaki . |
| 5,648,903 | 7/1997 | Liubakka . |

*Primary Examiner*—Robert J. Oberleitner
*Assistant Examiner*—C. T. Bartz
*Attorney, Agent, or Firm*—Oliff & Berridge, PLC

[57] ABSTRACT

A behavior control device of a vehicle, comprising: means for detecting vehicle speed; means for detecting steering angle of front left and front right wheels; means for detecting slip angle of at east one of rear left and rear right wheels; means for calculating a target value of the slip angle based upon parameters related with turn behavior of the vehicle including at least the vehicle speed detected by the vehicle speed detecting means and the steering angle detected by the steering angle detecting means; and control means for calculating a value of yaw moment to be applied to the vehicle body such that, when the calculated value of yaw moment is applied to the vehicle, the slip angle detected by the slip angle detecting means conforms to the target value thereof calculated by the target slip angle calculation means. The control means operates the brake means so as to variably brake a selected one or ones of the wheels to apply the calculated value of the yaw moment to the vehicle body. The behavior control device may further comprise means for calculating a liability of the vehicle body to spin for producing a spin value which generally increases along with increase of the spin liability; and means for calculating a liability of the vehicle body to drift-out for producing a drift-out value which generally increases along with increase of the drift-out liability, so that control means modifies the calculated value of the yaw moment applied to the vehicle body according to at least one of the spin value and the drift-out value such that the yaw moment applied to the vehicle body is greater as the spin value or the drift-out value is greater.

13 Claims, 10 Drawing Sheets

BEHAVIOR CONTROL DEVICE OF VEHICLE BASED UPON MONITORING MOVEMENT OF REAR WHEELS

BACKGROUND OF THE INVENTION

1. Field of the Invention

The present invention relates generally to a behavior control of a vehicle such as an automobile for improving the turn stability thereof, and more particularly, to the improvement of the turn behavior of the vehicle such that the vehicle is protected integrally against spin and drift-out.

2. Description of the Prior Art

It is well know that the automobiles and the like vehicles are, when unduly driven through a curved road or a corner, liable to a "spin" and/or a "drift-out", because the side force applied to the vehicle body as a centrifugal force can increase with no limit along with increase of vehicle speed and steering angle, while the tire grip force for holding the vehicle from the road surface is limited, particularly to be less on a slippery wet road.

Various endeavors have been made to suppress the automobiles and the like vehicles against spin and/or drift-out. An example is shown in Japanese Patent Laid-open Publication 6-24304, according to which controlled braking forces are applied to respective wheels by a feedback control system such that the actual yaw rate of the vehicle body conforms to a target yaw rate calculated based upon running conditions of the vehicle including steering condition.

SUMMARY OF THE INVENTION

In similar endeavors for further improving the vehicle behavior particularly against spin and drift-out, the present inventor has noted that the instability of the vehicle during its turn running such as spin and driftout can be integrally more effectively controlled by monitoring the movement of the rear wheels. As well known in the art, the spin of the vehicle is principally caused by saturation of the tire grip force at the rear wheels, while the drift-out is principally caused by saturation of the tire grip force at the steering front wheels. When the vehicle is steered by the front wheels as in the usual case, the front wheels at which the tire grip force has saturated are almost useless for suppressing or recovering the drift-out. As compared with the steering front wheels, the rear wheels are useful to control the drift-out, such that, when they are braked to effectively decelerate the vehicle, the centrifugal force acting at the vehicle body is decreased so as thereby to attenuate the drift-out. In this case, particularly when the rear wheel serving at the inside of the turn is braked, a yaw moment is thereby applied to the vehicle body in the direction of assisting the turn of the vehicle, thereby contributing to suppressing the drift-out. Further, even if the tire grip force of the rear wheels saturates, an outside sliding of the rear wheels also contributes to suppressing the drift-out. In suppressing a spin, although it is generally conventional that the front wheel at the outside of the turn is braked so as to apply a yaw moment to the vehicle in the direction of opposing the spin, a braking of the rear wheel at the outside of the turn is also effective to suppress the spin. In view of these, the rear wheels are considered to be more crucial in executing a controlled braking for the purpose of stability control so that the turn behavior of the vehicle is integrally controlled with respect to both spin and drift-out. In this connection, it is further considered to be prudent that such a rear wheel braking is controlled by monitoring the slip angle of the rear wheels which will conveniently reveal the behavior of the rear wheels in the integral control of the spin and the drift-out.

Therefore, it is a principal object of the present invention to provide a behavior control device of a vehicle which improves the turn behavior of the vehicle integrally with respect to the spin and the drift-out by paying a particular attention to the movement of the rear wheels.

In order to accomplish the above-mentioned object, the present application proposes a behavior control device of a vehicle including a vehicle body, front left, front right, rear left and rear right wheels, a steering means for steering said front left and front right wheels, and a brake means for selectively variably braking each of said front left, front right, rear left and rear right wheels, comprising:

means for detecting vehicle speed;

means for detecting steering angle of said front left and front right wheels;

means for detecting slip angle of at least one of said rear left and rear right wheels;

means for calculating a target value of said slip angle based upon parameters related with turn behavior of the vehicle including at least the vehicle speed detected by said vehicle speed detecting means and the steering angle detected by said steering angle detecting means; and control means for calculating a value of yaw moment to be applied to the vehicle body such that, when a yaw moment of the calculated value is applied to the vehicle, the slip angle detected by said slip angle detecting means conforms to said target value thereof calculated by said target slip angle calculation means, said control means operating said brake means so as variably to brake selected one or ones of said wheels to apply the yaw moment to the vehicle body as calculated.

The operation of the behavior control device of the above-mentioned construction will be modified to be more quickly responsive when said control means is further adapted to modify said calculation of yaw moment with change rate of said slip angle such that the yaw moment applied to the vehicle body is increased according to increase of said change rate coincident with change of said slip angle.

The behavior control device according to the present invention may further comprise:

means for calculating a liability of the vehicle body to spin for producing a spin value which generally increases along with increase of the spin liability;

means for calculating a liability of the vehicle body to drift-out for producing a drift-out value which generally increases along with increase of the drift-out liability;

wherein said control means modifies said yaw moment applied to the vehicle body according to at least one of said spin value and said drift-out value such that said yaw moment applied to the vehicle body is greater as said spin value or said drift-out value is greater.

In the above-mentioned construction, said spin liability calculating means and/or said drift-out liability calculating means may include a means for calculating a point in the vehicle body at which slip angle of the vehicle body is generally minimum, and estimates said spin liability at said point. By the spin liability and/or drift-out liability is calculated at such a point, noises to the control according to differences of driving manner are largely obviated.

In the above-mentioned construction of the behavior control device, said control means may combine said spin liability and said drift-out liability to provide a total instability liable factor for said modification of said yaw moment, such that said total instability liable factor emphasizes said spin liability more than said drift-out liability when said spin liability is greater than said drift-out liability and vice versa.

Or, alternatively, said control means may adopt said spin liability for said modification of said yaw moment when said spin liability is greater than said drift-out liability, while said control means adopts said drift-out liability for said modification of said yaw moment when said drift-out liability is greater than said spin liability.

Further, in the behavior control device according to the present invention, said control means may calculate said yaw moment such as to assist turn of the vehicle along a curved course when said detected slip angle is smaller than said calculated target slip angle, while said control means calculates said yaw moment such as to suppress turn of the vehicle along a curved course when said detected slip angle is greater than said calculated slip angle.

In such a construction, said control means may calculate said vehicle turn suppressing yaw moment to increase at a higher rate than said vehicle turn assisting yaw moment relative to increase of said slip angle detected by said slip angle detecting means.

Further, the behavior control device according to the present invention may further comprise:

means for detecting yaw rate of the vehicle body, and means for calculating a target value of yaw rate of the vehicle body, wherein said control means includes a first yaw moment calculating means for calculating a first component of said value of yaw moment to be applied to the vehicle body and a second yaw moment calculating means for calculating a second component of said value of yaw moment to be applied to the vehicle body such that, when a yaw moment composed of a first share of said first calculated component of yaw moment and a second share of said second calculated component of yaw is applied to the vehicle body, the slip angle detected by said slip angle detecting means conforms to said target value thereof calculated by said target slip angle calculation means, while the yaw rate detected by said yaw rate detecting means conforms to said target value thereof calculated by said target yaw rate calculation means.

In such a construction, said control means may control said first and second shares to be complementary to one another such that said first share is increased while said second share is decreased according to increase of the absolute value of said spin value.

Still further, the behavior control device according to the present invention may further comprise means for calculating friction coefficient of road surface, and said control means may modify said yaw moment applied to the vehicle body according to said friction coefficient such that said yaw moment applied to the vehicle body is greater as said friction coefficient is greater.

BRIEF DESCRIPTION OF THE DRAWING

In the accompanying drawing.

DESCRIPTION OF THE EMBODIMENTS

In the following, the present invention will be described in more detail in the form of some preferred embodiments with reference to the accompanying drawings.

Figure 1:
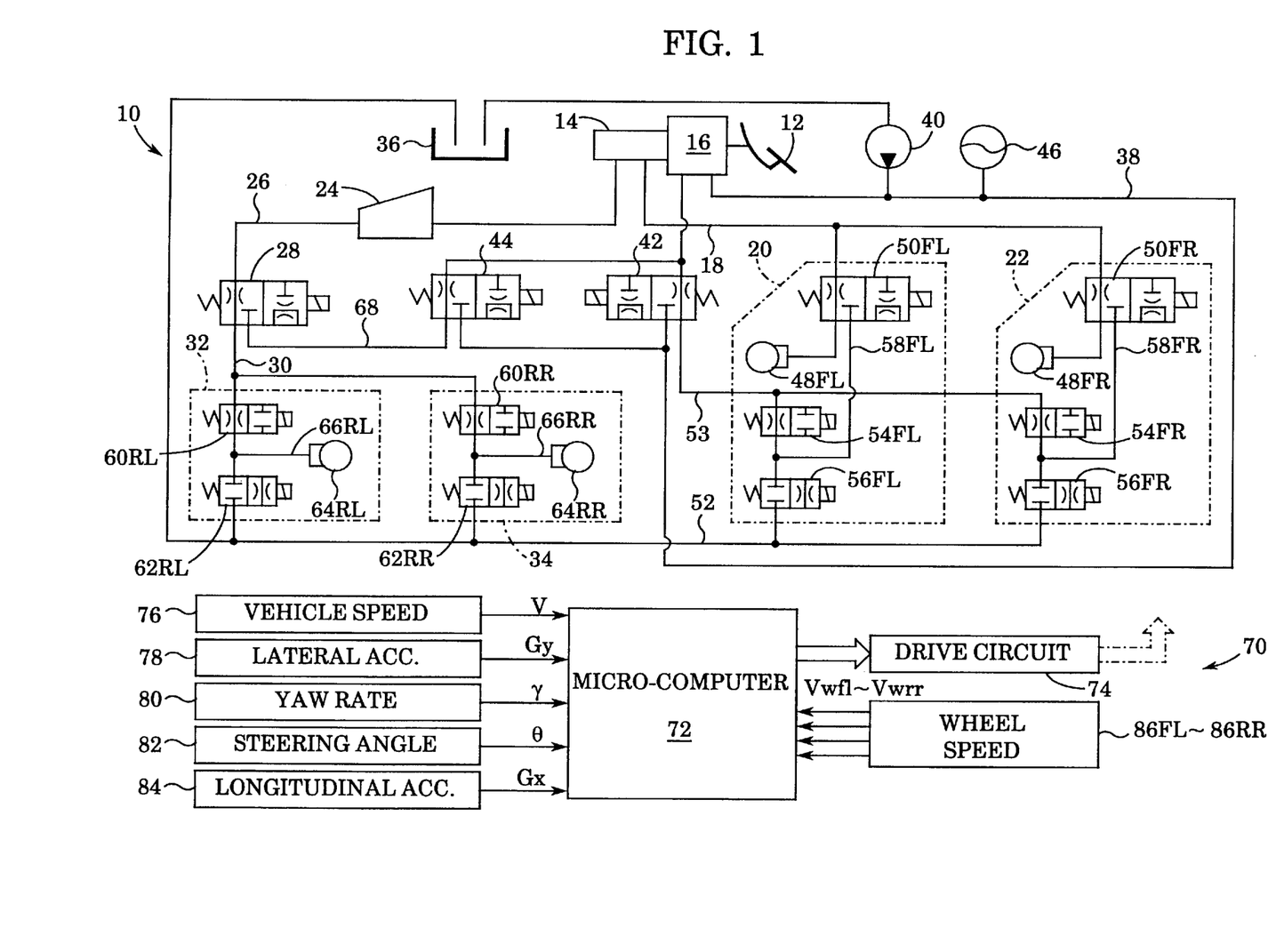
FIG. 1 is a diagrammatic illustration of hydraulic circuit means and electrical control means of an embodiment of the behavior control device according to the present invention.

First, referring to FIG. 1 showing diagrammatically an embodiment of the spin suppress control device of the present invention with regard to the constructions of its hydraulic circuit means and its electric control means, the hydraulic circuit means generally designated by 10 comprises a conventional foot brake pressure source means including a brake pedal 12 to be stepped on by a driver, a master cylinder 14 adapted to generate a foot brake pressure according to the stepping-on of the brake pedal 12, and a hydro-booster 16. A first passage 18 extends from a first port of the master cylinder 14 to a front left wheel brake pressure control means 20 and a front right wheel brake pressure control means 22. A second passage 26 including a proportioning valve 24 in its way extends from a second port of the master cylinder 14 to a rear left wheel brake pressure control means 32 and a rear right wheel brake pressure control means 34 via a 3-ports-2-positions changeover type electromagnetic control valve 28.

The hydraulic circuit means 10 further comprises a powered brake pressure source means including a reservoir 36 and a brake fluid pump 40 which delivers a pressurized brake fluid to a high pressure passage 38 to which an accumulator 46 is connected.

The brake pressure control means 20 and 22 of the front left and front right wheels include wheel cylinders 48FL and 48FR for applying braking force to the front left and front right wheels, 3-ports-2-positions changeover type electromagnetic control valves 50FL and 50FR, and series connections of normally open type electromagnetic on-off valves 54FL and 54FR and normally closed type electromagnetic on-off valves 56FL and 56FR, respectively, said series connections of the normally open type on-off valves and the normally closed type on-off valves being selectively connected between the high pressure passage 38 via a passage 53 and a 3-ports-2-positions changeover type electromagnetic valve 42 and a return passage 52 connected to the reservoir 36. A mid point of the series connection of the on-off valves 54FL and 56FL is connected to the control valve 50FL by a connection passage 58FL, and a mid point of the series connection of the on-off valves 54FR and 56FR is connected to the control valve 50FR by a connection passage 58FR.

The brake pressure control means 32 and 34 of the rear left and rear right wheels include wheel cylinders 64RL and 64RR for applying braking force to the rear left and rear right wheels, and series connections of normally open type electromagnetic on-off valves 60RL and 60RR and normally closed type electromagnetic on-off valves 62RL and 62RR, respectively, said series connections of the normally open type on-off valves and the normally closed type on-off valves being selectively connected between the passage 26 via a passage 30 and the 3-ports-2-positions changeover type electromagnetic control valve 28 or the high pressure passage 38 via the passage 30, the 3-ports-2-positions changeover type electromagnetic control valve 28 and a 3-ports-2-positions changeover type electromagnetic control valve 44 and the return passage 52 connected to the reservoir 36. A mid point of the series connection of the on-off valves 60RL and 62RL is connected to a wheel cylinder 64RL by a connection passage 66RL, and a mid point of the series connection of the on-off valves 60RR and 62RR is connected to a wheel cylinder 64RR by a connection passage 66RR.

The control valves 50FL and 50FR are respectively switched over between a first position for connecting the wheel cylinders 48FL and 48FR with the passage 18, while disconnecting the wheel cylinders 48FL and 48FR from the connection passages 58FL and 58FR, respectively, as in the state shown in the figure, and a second position for disconnecting the wheel cylinders 48FL and 48FR from the passage 18, while connecting the wheel cylinders 48FL and 48FR with the connection passages 58FL and 58FR, respectively.

The control valves 28 and 44 are respectively switched over between a first position for connecting the wheel cylinders 64RL and 64RR with the passage 26, while disconnecting the wheel cylinders 64RL and 64RR from the passage 38, as in the state shown in the figure, and a second position for disconnecting the wheel cylinders 64RL and 64RR from the passage 26, while connecting the wheel cylinders 64RL and 64RR with the passage 38.

When the control valves 50FL, 50FR, 28, 42 and 44 are in the first position as in the state shown in the figure, the wheel cylinders 48FL, 48FR, 64RL, 64RR are connected with the passages 18 and 26 so as to supply the pressure of the master cylinder 14 to the respective wheel cylinders, thereby enabling the driver to apply a braking force to each wheel according to the stepping-on of the brake pedal 12, whereas when the control valves 50FL, 50FR, 28, 42 and 44 are at the second position, the wheel cylinders are isolated from the master cylinder, the wheel cylinders 48FL, 48FR, 64RL, 64RR are supplied with the powered brake pressure under the control of the normally open on-off valves 54FL, 54FR, 60RL, 60RR and the normally closed on-off valves 56FL, 56FR, 62RL, 62RR according to the ratio of the open state of the corresponding normally open valve and the closed state of the corresponding normally closed valve, i.e. the so-called duty ratio, regardless of the stepping-on of the brake pedal 12.

The control valves 50FL, 50FR, 28, 42 and 44 normally open on-off valves 54FL, 54FR, 60RL, 60RR, normally closed on-off valves 56FL, 56FR, 62RL, 62RR and the pump 40 are all controlled by an electric control means 70 as described in detail hereinbelow. The electric control means 70 consists of a micro-computer 72 and a driving circuit means 74. Although not shown in detail in FIG. 1, the micro-computer 72 may have a general construction including a central processing unit, a read only memory, a random access memory, input and output port means and a common bus interconnecting these functional elements.

The input port means of the micro-computer 72 is supplied with a signal showing vehicle speed V from a vehicle speed sensor 76, a signal showing lateral acceleration Gy of the vehicle body from a lateral acceleration sensor 78 mounted substantially at a mass center of the vehicle body, a signal showing yaw rate $\gamma$ of the vehicle body from a yaw rate sensor 80, a signal showing steering angle $\theta$ from a steering angle sensor 82, a signal showing longitudinal acceleration Gx of the vehicle body from a longitudinal acceleration sensor 84 mounted substantially at the mass center of the vehicle body, and signals showing wheel speed (wheel circumferential speed) Vwfl, Vwfr, Vwrl, Vwrr of front left and front right wheels and rear left and rear right wheels from wheel speed sensors 86FL–86RR, respectively. The lateral acceleration sensor 78, the yaw rate sensor 80 and the steering angle sensor 82 detect the lateral acceleration, yaw rate and steering angle, respectively, to be positive when the vehicle makes a left turn, and the longitudinal acceleration sensor 84 detects longitudinal acceleration to be positive when the vehicle is accelerated in the forward direction. In general, in the following analyses, the parameters which are distinctive of the direction of turn of the vehicle are each assumed to be positive when the turn is anti-clockwise and negative when the turn is clockwise, as viewed from the top of the vehicle.

The read only memory of the micro-computer 72 stores such flowcharts as shown in FIGS. 2, 3, 7–9 and such maps as shown in FIGS. 4–6, 10–11. The central processing unit conducts various calculations based upon the parameters detected by the above-mentioned various sensors according to those flowcharts and maps as described hereinbelow, so as to obtain a spin quantity for judging and estimating the spin state of the vehicle, and controls the turn behavior of the vehicle based upon the estimated conditions, particularly to suppress the vehicle from spinning, by applying a braking force to the front wheel at the outside of the turn.

In the following, the present invention will be described from the aspect of operations thereof.

First, the outline of the control operation conducted by the device of the present invention will be described according to the flowchart of FIG. 2. The control operation according to this flowchart is started by a closure of an ignition switch not shown in the figure and carried out repetitively at a predetermined time cycle.

Step 50

In this first step, signals representing vehicle speed V and others are read in from the vehicle speed sensor 76 and other sensors such as shown in FIG. 1.

Step 100

This step is provided to obtain the values of basic parameters such as slip angle of the vehicle body at its center of gravity and friction coefficient of road surface expressed hereinbelow as β and μ, respectively, based upon the information obtained in step 50. For this purpose, lateral acceleration Vyd is first calculated as Gy-V*γ, and Vyd is integrated to provide lateral velocity Vy. Vehicle speed V is usable as longitudinal velocity of the vehicle at the center of gravity thereof, Vx. Thus, β and μ are available as follows:

$$\beta = Vy/Vx \qquad (1)$$

$$\mu = (Gx^2 + Gy^2)^{1/2}/g \qquad (2)$$

wherein "g" is the acceleration of gravity.

Step 150

This step is provided to obtain values herein called "spin value" SV, "drift-out value" DV and "total control factor" Ct. The spin value SV is a parameter to represent a liability of the vehicle to spin, while the drift-out value DV is a parameter to represent a liability of the vehicle to drift out. The total control factor Ct is a parameter to represent a combination of the spin value and the drift-out value with inclusion of a control concept regarding how one of the spin value and the drift-out value is put priority over the other when they are not of the same level. The total control factor Ct thus obtained is used to determine how far the yaw moment calculated in the next step 200 for most ideally controlling the turn stability of the vehicle is actually applied to the vehicle body by means of braking some wheels, because, although from the view point of obtaining the best turn stability it is desirable that the yaw moment thus calculated is just fully applied to the vehicle body, from the view point of driving economy and life of brakes any braking for purposes other than decelerating or stopping the vehicle is to be withheld. Indeed, the yaw moment actually applied to the vehicle body according to the present invention is controlled to be a product of the ideally calculated yaw moment and the total control factor Ct. The detail of the processing is described hereinbelow with reference to FIG. 3.

Step 200

In this step, the yaw moment to be applied to the vehicle body is calculated on the basis of accomplishing a most ideal turn stability based upon several parameters according to a particular control concept of the present invention. As described in the introductory description of the present invention, the most important point of the control concept herein proposed is in that the yaw moment is calculated such that the slip angle of the rear wheels conforms to a target value thereof. The detail of the processing is described hereinbelow with reference to FIG. 4.

Step 250

This step is provided to incorporate the driver's operation of the brake pedal into the automatic stability control by the control system. The detail of the processing is described hereinbelow with reference to FIG. 5.

Step 300

This step is provided to determine how the respective wheels are to be braked in order to generate the yaw moment calculated above. It is convenient that the braking to be applied to the respective wheels are controlled such that the slip ratios of the respective wheels conform to the respective target values thereof. In order to execute such a control, the target slip ratios of the respective wheels are calculated. The detail of the processing is described hereinunder with reference to FIG. 6.

Step 350

This step is provided to determine which of the front left and front right wheels is to be selected as a reference wheel to calculate the target slip ratio of the wheel to be braked. The detail of the processing is described with reference to FIG. 7.

Step 400

In this step, the target slip ratios are converted into the corresponding target wheel speeds in reference to the wheel speed of the reference wheel. The detail of the processing is described hereinbelow.

Step 450

In his step, duty ratio of supplying and exhausting brake fluid to and from each wheel cylinder is obtained with respect to each wheel based upon the slip rate calculated as a difference between the wheel speed of the wheel to be braked and the wheel speed of the reference wheel. The detail of the processing is described hereinbelow.

Step 500

In this final step, the braking of the wheel or wheels concerned is executed.

Figure 3:
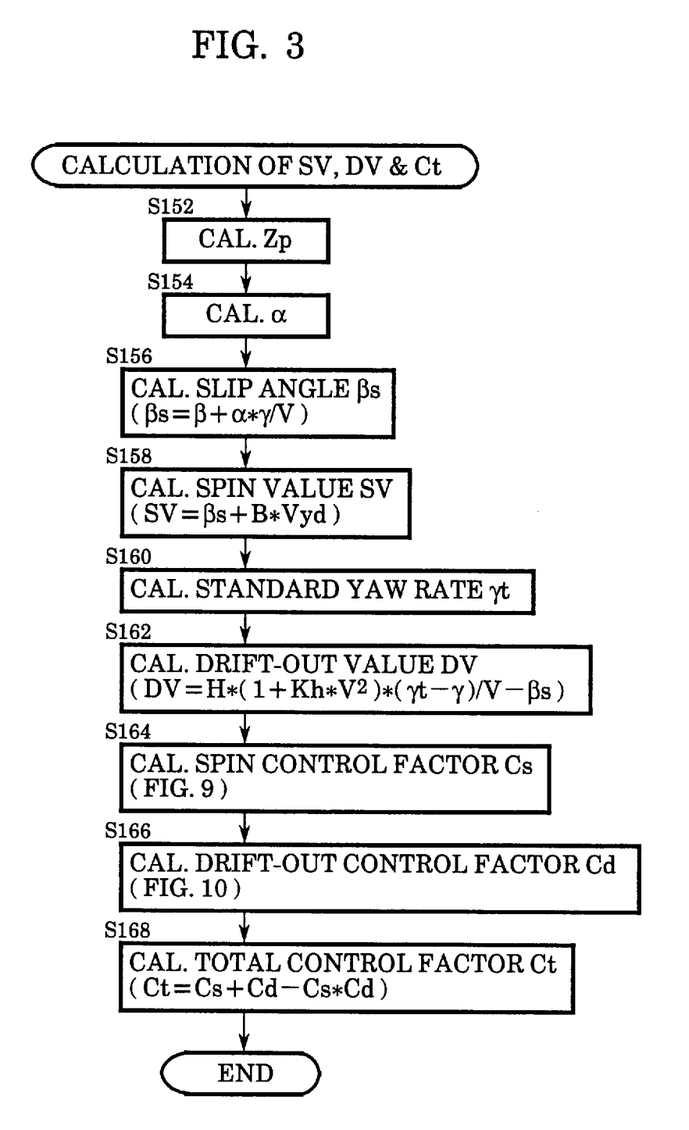
FIG. 3 is a flowchart showing the control operation carried out in step 150 of the flowchart of FIG. 2.

Now, referring to FIG. 3, the processing for obtaining the total control factor Ct is described.

Figure 17:
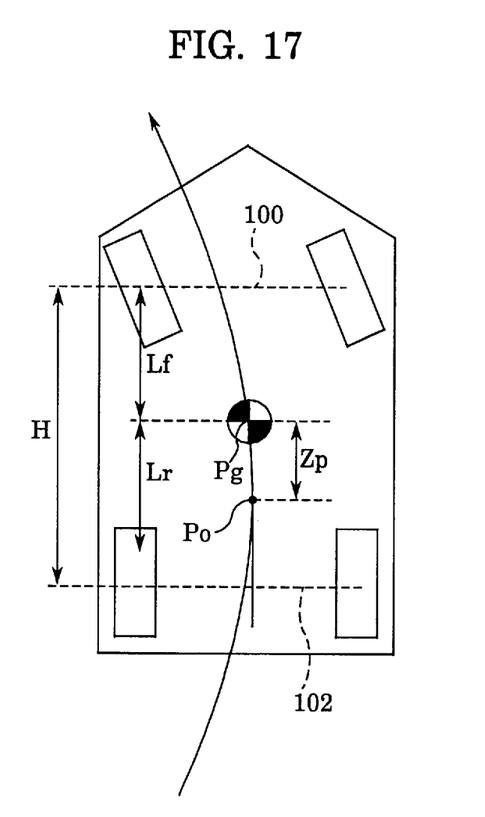
FIG. 17 is a diagrammatic illustration of a vehicle during a driving turn.

In step 152, a distance Zp such as illustrated in FIG. 17 is obtained which is the distance from the center of gravity Pg of the vehicle body to a point Po in the vehicle body at which the vehicle body shows zero slip angle. (When a vehicle is driven along a curved course, various portions of the body of the vehicle show variously different slip angles.) In view of this, it is considered to be desirable that the estimation of Ct is made at such a point Po. Such a distance Zp is available by the following formula 3 known as "Linear Theory", provided that the vehicle is making no spin and no drift-out:

$$Zp = Lr*\{1-(2^{1/2}M*Lf*V^2)/(H*Lr*Cr)\} \qquad (3)$$

wherein M is the mass of the vehicle body, Cr is the cornering power of rear wheels, and H, Lf and Lr are those dimensions shown in FIG. 17. One of ordinary skill in the art would appreciate that "*" is used herein as a multiplication sign.

Figure 8:
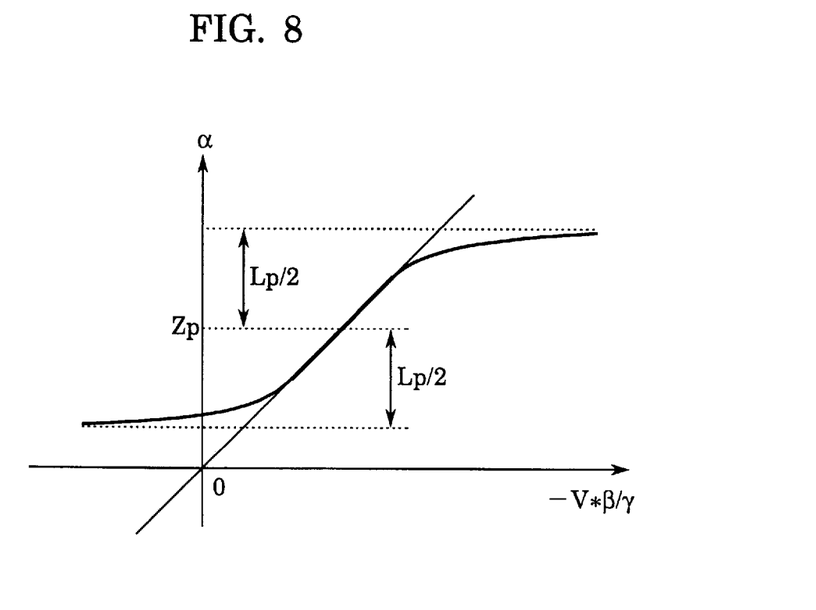
FIG. 8 is a graph showing the nature of mathematical processing by formula 4.

The point Po is a point at which the vehicle body shows zero slip angle according to the "Linear Theory" based upon the condition that the vehicle is making no spin and no drift-out. In order to deal with the behavior of the vehicle including spin and drift-out, in step 154, a point at which the slip angle will be minimum even at an early stage of spin and/or drift-out is estimated as modified from point Po depending upon such parameters as V, β and γ considered to be influential thereon, so that a point substantially equivalent to point Po is estimated within a limited range of an appropriate distance Lp such as 50–100 cm around Po as follows:

$$\alpha = Zp + Lp*\Theta[(-V*\beta/\gamma - Zp)/Lp]/2 \qquad (4)$$

wherein Θ [x] is a function which provides an output which is proportional to x around x=0 but saturates toward 1 or −1 when x increases or decreases apart from 0. Therefore, value α having a performance such as shown in FIG. 8 is available as a distance from the center of gravity Pg to point Po, as being variable according to changes of V, β and γ. (Zp is also a variable, as is apparent from formula 3, dependent upon vehicle speed V and the cornering power Cr which is dependent upon V and γ.)

In step 156, slip angle βs of the vehicle body at point Po is calculated as follow:

$$\beta s = \beta + \alpha^* \gamma / V \quad (5)$$

In step 158, the spin value SV is defined to represent the liability of the vehicle body to spin as estimated at point Po, and calculated, by selecting an appropriate proportional constant Ks for the influence of side slide acceleration Vyd, as follows:

$$SV = \beta s + K s^* V y d \quad (6)$$

In step 160, standard yaw rate γc is calculated based upon vehicle speed V and steering angle θ as follows:

$$\gamma c = V^* \theta / (1 + K h^* V^2)^* H / R g \quad (7)$$

wherein Kh is a due constant and Rg is the gear ratio of the steering system.

Further, by selecting an appropriate value of time constant T for Laplace operator s, γc is modified to provide a final standard yaw rate γt as follows:

$$\gamma t = \gamma c / (1 + T^* s) \quad (8)$$

In step 162, the drift-out value DV is defined to represent the liability of the vehicle body to drift-out, as estimated at point Po, and calculated follows:

$$DV = H^*(1 + K h^* V^2)^*(\gamma t - \gamma) / V - \beta s \quad (9)$$

Figure 9:
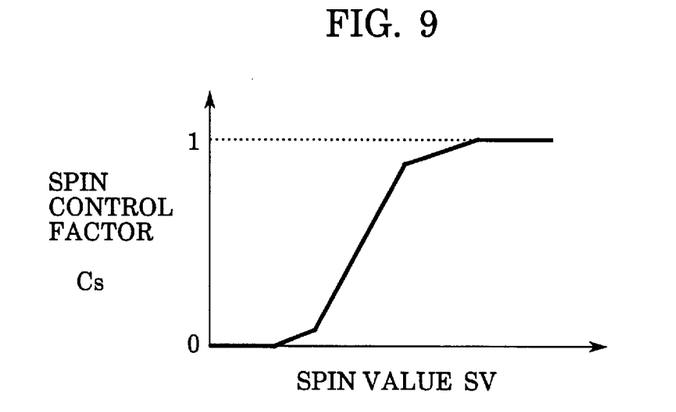
FIG. 9 is a map showing a design embodiment of the spin control factor.
Figure 10:
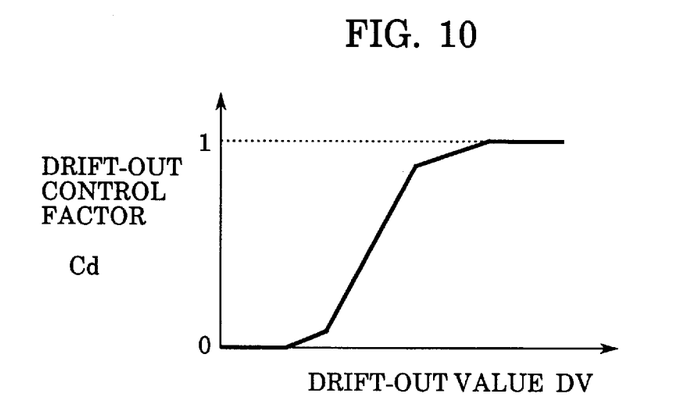
FIG. 10 is a map showing a design embodiment of the drift-out control factor.

In step 164, a value herein called "spin control factor" Cs is obtained by looking at a map such as shown in FIG. 9 based upon the spin value SV obtained above, as a factor which represents a degree of requirement of the spin suppress control. Then in step 166, a value herein called "drift-out control factor" Cd is obtained by looking at a map such as shown in FIG. 10 based upon the drift-out value DV obtained above, as a factor which represents a degree of requirement of the drift-out suppress control. In looking at the map of FIG. 10, the drift-out value may be approximated as $DV = H^*(\gamma t - y)/V$.

In step 168, the total control factor Ct is calculated as follows:

$$Ct = Cs + Cd - Cs^* Cd \quad (10)$$

The above calculation by formula 10 provides a value of Ct which emphasizes either Cs or Cd more than the other when either Cs or Cd is much greater than the other, while providing a value which is greater than a mean value of Cs and Cd when Cs and Cd are close to one another. Therefore, the processing of Cs and Cd according to formula 10 may be replaced by a selection process such as:

$$Ct = CS \text{ when } Cs > Cd \quad (11)$$

$$Ct = Cd \text{ when } Cs < Cd \quad (12)$$

In any event, the magnitude of the total control factor Ct thus obtained shows how much the vehicle body is going to be or is already being subjected to spin and/or drift-out as viewed at point Po where the deviation of the vehicle body from the due course of driving is detectable with minimum noise due to variations of the manner of driving the vehicle.

Figure 4:
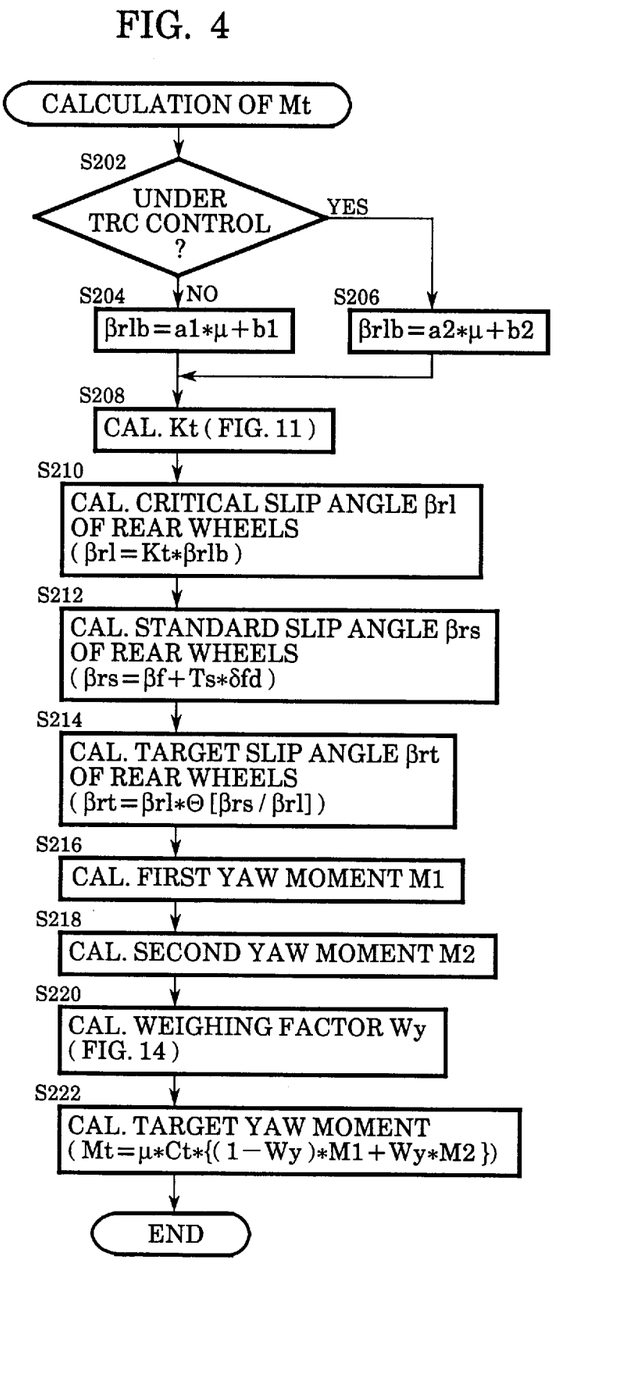
FIG. 4 is a flowchart showing the control operation carried out in step 200 of the flowchart of FIG. 2.

Next, referring to FIG. 4, it is described how the target of the yaw moment to be applied to the vehicle body is calculated.

In step 202, it is first checked if a traction control is being carried out. The influence of the traction control can be incorporated into the stability control of the present invention by a modification of the critical slip angle β rlb of rear wheels so that it is calculated in step 204 or 206 by formula 13 or 14 according to whether the traction control is at rest or is being carried out, respectively:

$$\beta rlb = a1^* \mu + b1 \quad (13)$$

$$\beta rlb = a2^* \mu + b2 \quad (14)$$

wherein a1, a2, b1 and b2 are all constants appropriately selected to be a1>a2 and b1>b2, because the influence of the traction control will be estimated by a corresponding reduction of the critical slip angle due to sharing thereof for the traction control. It is to be noted that, although the critical slip angle is proportional to the friction coefficient μ of the road surface, an additive modification by constant b1 or b2 is herein incorporated, considering that the precision of estimation of the friction coefficient is limited, and that when the vehicle is driven to turn on a road having a low friction coefficient, a slightly greater slip angle for the rear wheels is desirable as it gives the driver a stable drive feeling. Further, although in the descriptions hereinbelow related with the rear wheels, a pair of rear left and rear right wheels are generally processed as a whole, the rear left and rear right wheels may be differently processed in view of the difference of load applied thereto due to the shift of load of the vehicle body to the outside of the turn.

Figure 11:
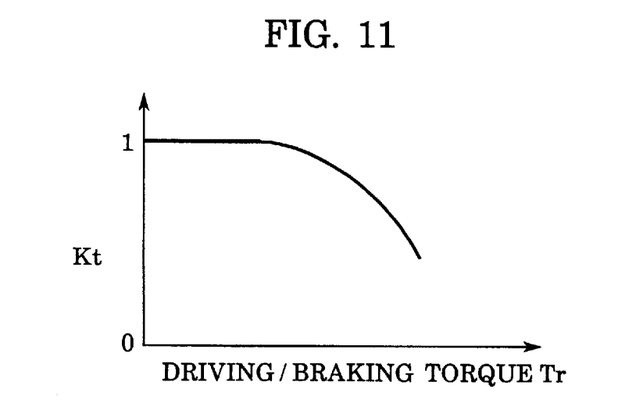
FIG. 11 is a map showing a design embodiment of factor Kt for estimating critical slip angle.

In steps 208 and 210, the value of the critical slip angle β rlb of the rear wheels is further modified against a driving or braking torque applied thereto by looking at a map such as shown in FIG. 11 for a factor Kt based upon the driving or braking torque Tr, so that β rlb is multiplied by the factor Kt to provide a modified critical slip angle β rl (β rl=Kt*β rlb). The driving torque can be estimated from engine intake air flow according to calculations well known in the art. The braking torque, when applied according to the present invention, is of course known when the control circulating through these flowcharts has once started.

In step 212, slip angle β f of the front wheel is calculated from the slip angle β of the vehicle body at the center of gravity thereof, yaw rate γ, vehicle speed V, steering angle θ and the gear ratio Rg of the steering system, according to the following formula:

$$\beta f = \beta + L f^* \gamma / V - \theta / R g \quad (15)$$

Then, by modifying the slip angle βf of the front wheel by steering speed δ fd (differential of steering angle) of the front wheel with an appropriate time constant Ts, standard slip angle βfs of the front wheels is calculated as follows:

$$\beta fs = \beta f + T s^* \delta fd \quad (16)$$

As an alternative, standard slip angle of front wheels may be calculated from the drift-out value DV as follows:

$$\beta fs = DV + T s^* \delta fd \quad (17)$$

The time constant Ts reflects an inertial effect of the vehicle body variable according to the quickness of change of the slip angle of the front wheels. The value of the time constant Ts will be desirably determined in consideration of the general dynamics of the vehicle.

Figure 12:
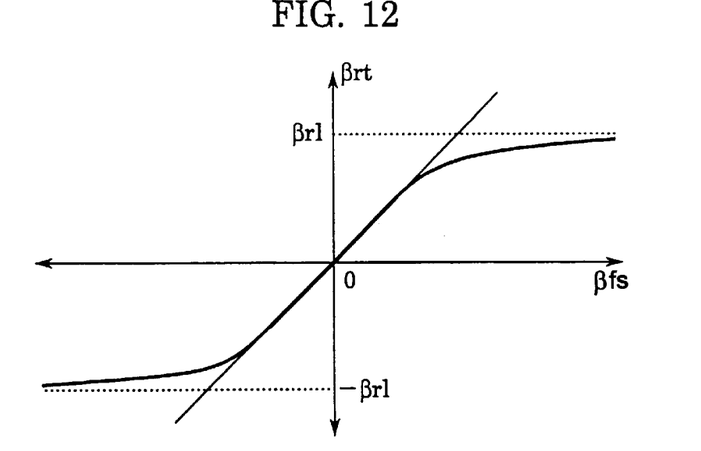
FIG. 12 is a graph showing the nature of mathematical processing by formula 18.

As will be noted, DV is a parameter also depending upon steering angle θ and vehicle speed V. There may be other calculations for estimation of the standard slip angle of front wheels βrs. Then in step 214, a target slip angle β rt of the rear wheels is estimated from the standard slip angle β fs of the front wheels not to exceed a critical slip angle βrl by the Θ function as follows (FIG. 12):

$$\beta\ rt = \beta\ rl * \Theta[\beta\ fs/\beta\ rl] \tag{18}$$

Herein it is assumed that, since the ratio of the slip angle of the front wheels to that of the rear wheels is equal to CfLf/CrLr (Cf and Cr are the cornering forces of the front and rear wheels, respectively) and the ratio CfLf/CrLr may be approximated generally to 1 within the slip limit, the target slip angle β rt of the rear wheels modified not to exceed the critical value β rl may be estimated based upon the ratio β fs/β rl by means of the function Θ.

In step 216, the actual slip angle βr of the rear wheels is calculated based upon the slip angle β obtained in step 100 with respect to the center of gravity of the vehicle body, as follows:

$$\beta r = \beta + L r * \gamma / V \tag{19}$$

Figure 13:
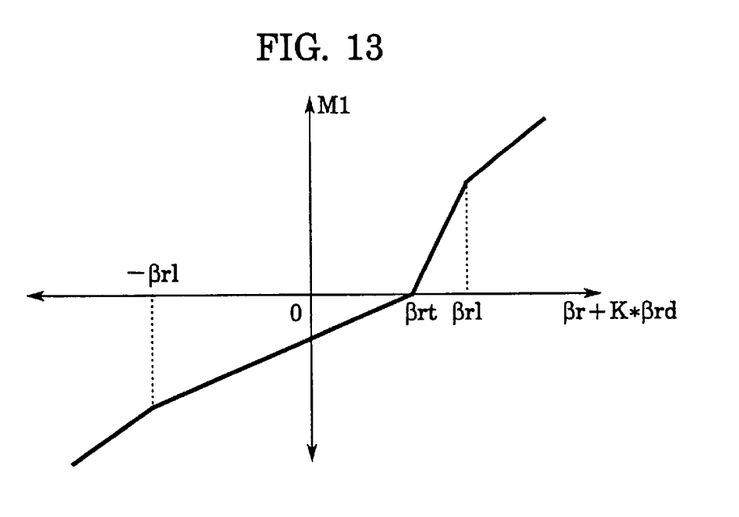
FIG. 13 is a map showing a design embodiment of the target yaw moment based upon the slip angle of the rear wheels.

Then, by calculating differential β rd of β r with selecting of an appropriate constant K for β rd, a first yaw moment M1 is calculated to show a performance curve such as shown in FIG. 13 against β r+K*β rd. M01 is an appropriate magnification factor:

When β r+K*β rd>β rl $$M1 = M01 * (\beta r + K * \beta\ rd) \tag{20}$$

When β rt<(βr+K*β rd)<β rl $$M1 = \{\beta\ rl * M01/(\beta\ rl - \beta\ rt)\}(\beta\ r - \beta rt + K * \beta\ rd) \tag{21}$$

When −β rl<(β r+K*β rd)<β rt $$M1\{\beta\ rl * M01/(\beta\ rl + \beta\ rt)\}(\beta\ r - \beta\ rt + K * \beta\ rd) \tag{22}$$

As will be appreciated from the performance shown in FIG. 13, according to the present invention, the yaw moment M1 is calculated as a moment which, when applied to the vehicle body, turns the vehicle body in the direction of turn thereof when the slip angle of the rear wheels is smaller than the target slip angle β rt therefor, and when the slip angle βr of the rear wheels exceeds the target slip angle β rt, M1 is turned into an anti-spin moment which is increased at a relatively high rate according to increase of the slip angle difference than in the turn assisting yaw moment. (In this connection, indeed in the map of FIG. 13, the abscissa is β r+K*β rt, for the convenience of a proportional and differential control which guarantees better quality of control. The term of K*β rt is not of a primary importance.) By such a yaw moment M1 being constantly estimated based upon the slip angle β r of the rear wheels, and applied to the vehicle body when desired, i.e. according to the value of the total control factor Ct as described hereinbelow in step 222, the vehicle is constantly protected against any spin and drift-out.

In step 218, a second yaw moment M2 is calculated, with selection of an appropriate positive constant factor M02, as follows:

$$M2 = M01 * H * (\gamma\ t - \gamma)/V \tag{23}$$

As will be noted, the yaw moment M2 is based upon the difference between the target yaw rate γ t and the actual yaw rate γ. This term is considered for a better quality of control because of the below-mentioned reasons.

Figure 14:
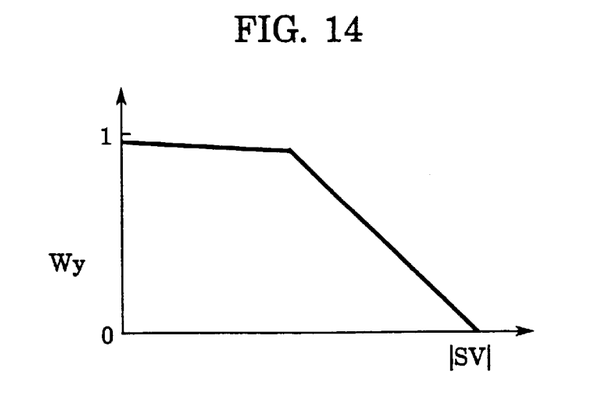
FIG. 14 is a map showing a design embodiment of weighing factor for the first target yaw moment based upon the slip angle of the rear wheels and the second target yaw moment based upon the yaw rate of the vehicle body.

Comparing M1 with M2, M1 is generally less accurate than M2, because the precision of estimation of the slip angle is affected by various conditions of the road surface, while when the vehicle has approached a spin, the control based upon the slip angle is more important. In view of the above, in step 220, a weighing factor Wy is obtained by looking at a map such as shown in FIG. 14 based upon the absolute value of the spin value SV, and then in step 222, a final target yaw moment Mt is calculated according to the following formula 23, by combining M1 and M2 with the weighing factor Wy, so that M1 is regarded more important when the spin value SV has increased. Then, finally, the final target yaw moment Mt is made proportional to the total control factor Ct, the liability to spin and drift-out as a whole, and also to the friction coefficient μ, so that the magnitude of the yaw moment applied to the vehicle body is kept at a moderate level proportional to the current liability of the vehicle body to spin and drift-out, i.e. the requirement for the stability control:

$$Mt = \mu * Ct * \{(1 - Wy) * M1 + Wy * M2\} \tag{24}$$

Figure 5:
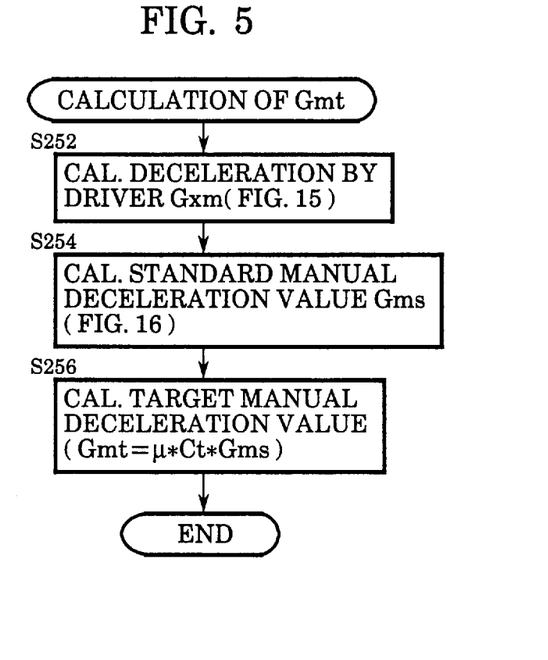
FIG. 5 is a flowchart showing the control operation carried out in step 250 of the flowchart of FIG. 2.

Next, referring to FIG. 5, the processing with regard to manual deceleration value Gmt is described.

Figure 15:
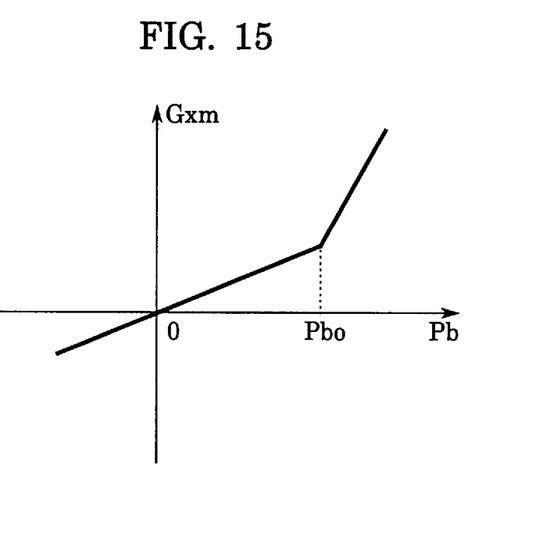
FIG. 15 is a map showing a design embodiment of longitudinal deceleration by driver's stepping on the brake pedal.

It is often probable that the driver steps on the brake pedal when the vehicle is being driven along a curved course. When the driver steps on the brake pedal, generally at lease front wheels are left open for the manual braking by the driver. As will be understood hereinbelow, the application of controlled braking to the wheels according to the behavior control of the present invention is finally executed to let the slip ratios of the respective wheels conform to the corresponding target slip ratios calculated against a reference wheel for which a front wheel at the inside of the turn is generally adopted. Therefore, when the front wheels are braked by the stepping on the brake pedal by the driver, the wheel speed of the reference wheel is correspondingly decreased. When the wheel speed of the reference wheel lowers, the control amount due for the wheels to be controlled must be correspondingly increased. Such a modification is necessary. Therefore, in step 252, looking at a map such as shown in FIG. 15 based upon brake master cylinder pressure Pb, longitudinal acceleration Gxm effected by the driver's braking action is estimated. In FIG. 15, Pbo is a master cylinder pressure at which the hydro-booster 16 saturates. An increase of the master cylinder pressure beyond such a point implies that the driver's intention for braking is very high. Therefore, Gxm is estimated to increase more steeply against the increase of the master cylinder pressure.

Figure 16:
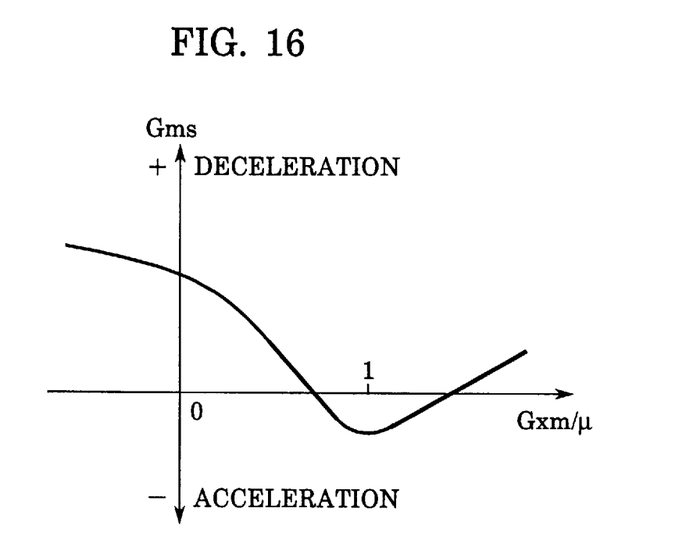
FIG. 16 is a map showing a design embodiment of the deceleration effected by the driver's braking.

In step 254, looking at a map such as shown in FIG. 16, standard manual deceleration value Gms is obtained based upon Gxm/μ. Although Gxm represents the driver's intention for braking the vehicle, if the control amount (amount for automatic braking) is increased proportionally to the driver's braking intention, the vehicle will be too much decelerated by a productive effect of the reduction of the wheel speed of the reference wheel and the increase of the control amount modified against the reduction of the reference wheel speed. Therefore, the standard manual deceleration value Gms is designed to show such a performance as shown in FIG. 16 against the driver's braking action.

In step 256, the standard manual deceleration value Gms is modified with the friction coefficient μ of the road surface and the total control factor Ct as follows:

$$Gmt = \mu * Ct * Gms \tag{25}$$

Figure 6:
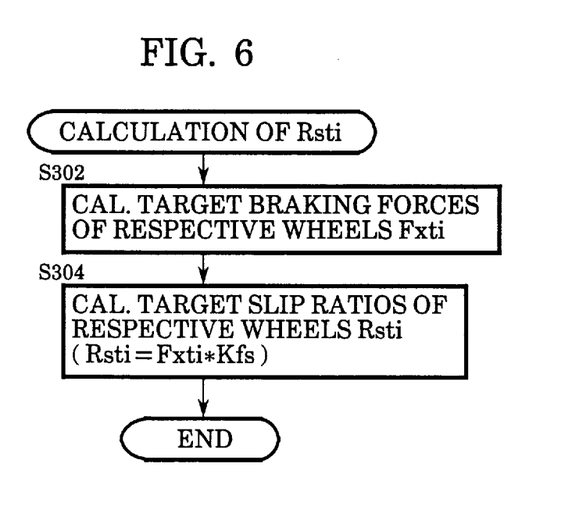
FIG. 6 is a flowchart showing the control operation carried out in step 300 of the flowchart of FIG. 2.

Next, referring to FIG. 6, the calculation of target slip ratio Rsti (i=fl, fr, rl, rr) of front left, front right, rear left and rear right wheels is described.

In step 302, according to a distribution ratio Kf of the target yaw moment Mt for the front wheels relative to the rear wheels, target braking forces Fxti (i=fl, fr, rl, rr) for front left, front right, rear left and rear right wheels are calculated as follows:

$$Fxtfl=Mt^*\{1/(T^*\cos\theta-a^*\sin\theta)+g^*m^*Gmt\}^*Kf^*(1-Gy/Gwy-Gx/Gwx) \quad (26)$$

$$Fxtfr=-Mt^*\{1/(T^*\cos\theta+a^*\sin\theta)+g^*m^*Gmt\}^*Kf^*(1+Gy/Gwy-Gx/Gwx) \quad (27)$$

$$Fxtrl=Mt^*\{1/T+g^*m^*Gmt\}^*(1-Kf)^*(1-Gy/Gwy+Gx/Gwx) \quad (28)$$

$$Fxtrr=-Mt^*\{1/T+g^*m^*Gmt\}^*(1-Kf)^*(1+Gy/Gwy+Gx/Gwx) \quad (29)$$

wherein g is the acceleration of gravity, m is a share of the mass of the vehicle body on each wheel, T is the wheel tread of the vehicle, Gwx is a value of longitudinal acceleration with which the load on the rear wheels becomes zero, Gwy is a value of lateral acceleration with which the load of the left or right wheels becomes zero, and a is an appropriate constant.

In step 304, denoting the conversion ratio of the slip ratio to the braking force by Kfs, target slip ratios of front left, front right, rear left and rear right wheels Rsti (i=fl, fr, rl, rr) are calculated as follows:

$$Rsti=Fxti^*Kfs \quad (30)$$

Figure 7:
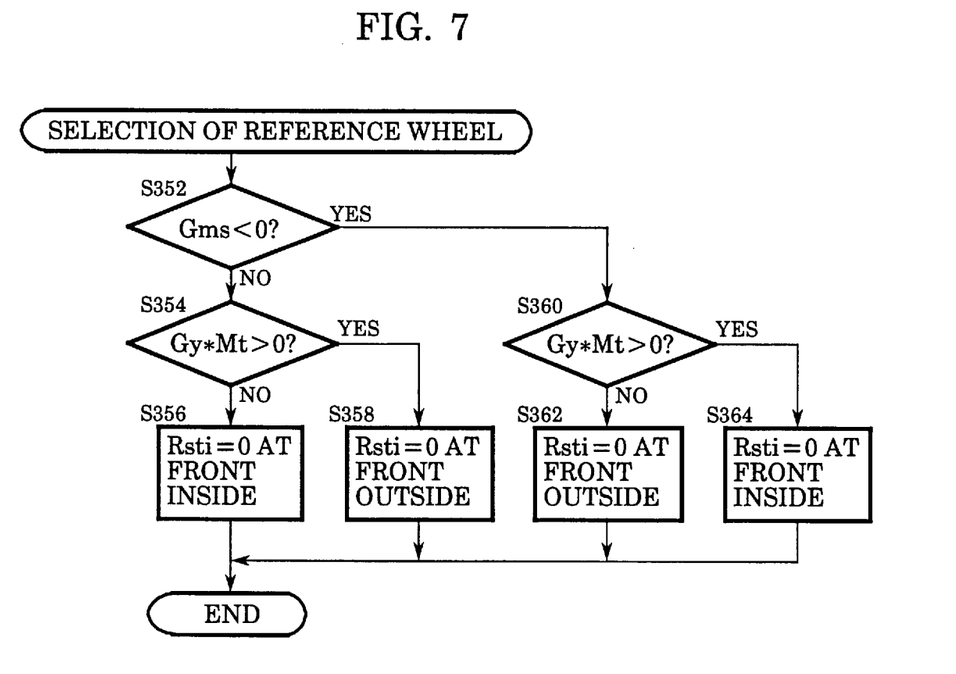
FIG. 7 is a flowchart showing the control operation carried out in step 350 of the flowchart of FIG. 2.

Next, referring to FIG. 7, it is described how the reference wheel is determined.

In step 352, it is judged if Gms is negative, i.e. if the brake pedal is not stepped on. If the answer is no, the control proceeds to step 354, whereas if the answer is yes, the control proceeds to step 360. In step 354, it is judged if Gy*Mt is positive, i.e. if the target yaw moment is in the direction of assisting the turn of the vehicle. If the answer is no, the control proceeds to step 356, whereas if the answer is yes, the control proceeds to step 358. In step 360, it is judged if Gy*Mt is positive, i.e. if the target yaw moment is in the direction of assisting the turn of the vehicle. If the answer is no, the control proceeds to step 362, whereas if the answer is yes, the control proceeds to step 364.

When the control reaches step 356, the front wheel at the inside of the turn is made the reference wheel. When the control reaches step 358, the front wheel at the outside of the turn is made the reference wheel. When the control reaches step 362, the front wheel at the outside of the turn is made the reference wheel. When the control reaches step 364, the front wheel at the inside of the turn is made the reference wheel. At the reference wheel, the slip ratio Rsti (i=fl, fr, rl, rr) is made 0.

Referring again to FIG. 2, in step 400, denoting Vb as the wheel speed of the reference wheel determined as described above, target wheel speeds Vwti (i=fl, fr, rl, rr) of the front left, front right, rear left and rear right wheels are calculated as follows:

$$Vwti=Vb^*(1-Rsti) \quad (31)$$

In step 450, duty ratios Dri (i=fl, fr, rl, rr) for operating the brakes of the respective wheels are calculated, by selecting Kp and Kd as appropriate proportional constants, as follows:

$$Dri=KP^*(Vwi-Vwti)+Kd^*d(Vwi-Vwti)/dt \quad (32)$$

In step 500, the braking of the respective wheels are carried out according to the respective duty ratios. In more detail, when, for example, the braking is applied to the front left wheel according to the behavior control of the present invention, the control valves 42 and 50FL are changed over to the positions opposite to those shown in FIG. 1, so that the series connection of the normally open type on-off valve 54FL and the normally closed type on-off valve 56FL is supplied with the high accumulator pressure of the passage 38, and then the ratio of open period to closed period of the normally open type on-off valve 54FL is controlled to conform to a positive value of the duty ratio with the normally closed type on-off valve 56FL being kept closed, while when the value of the duty ratio is negative, the ratio of open period to closed period of the normally closed type on-off valve 56FL is controlled to conform to the absolute value of the duty ratio with the normally open type on-off valve 54FL being kept closed.

Figure 2:
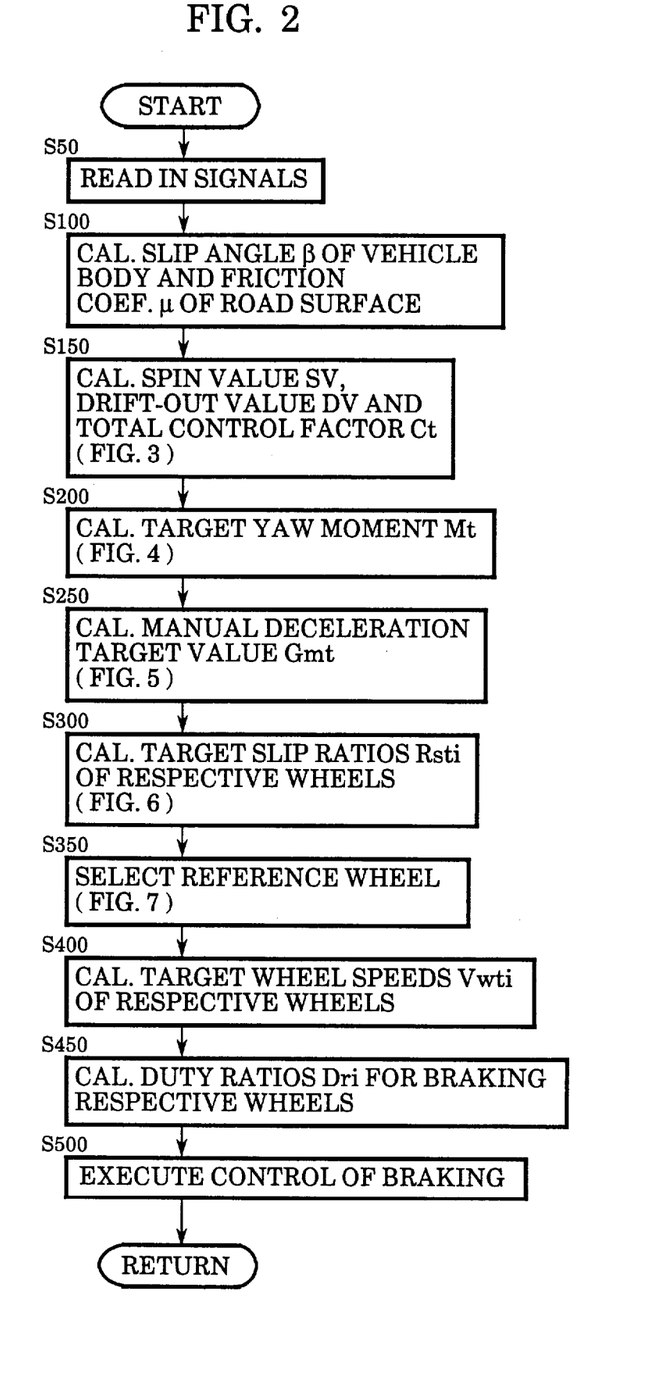
FIG. 2 is a flowchart showing the overall control operation carried out by the behavior control device of the present invention.

Now it is believed that the control operations shown as a whole in FIG. 2 have been totally understood.

Although the present invention has been described with respect to a particular embodiment thereof, it will be apparent for those skilled in the art that various modifications are possible with respect to the shown embodiments within the scope of the present invention.

I claim:

1. A behavior control device for a vehicle including a vehicle body, front left, front right, rear left and rear right wheels, steering means for steering said front left and front right wheels, and brake means for selectively variably braking each of said front left, front right, rear left and rear right wheels, comprising:

means for detecting vehicle speed;

means for detecting steering angle of said front left and front right wheels;

means for detecting slip angle of at least one of said rear left and rear right wheels;

means for calculating a target value of said slip angle based upon parameters related with turn behavior of the vehicle including at least the vehicle speed detected by said vehicle speed detecting means and the steering angle detected by said steering angle detecting means; and control means for calculating a value of yaw moment to be applied to the vehicle body such that, when the calculated value of the yaw moment is applied to the vehicle body, the slip angle detected by said slip angle detecting means conforms to said target value thereof calculated by said target slip angle calculation means, said control means operating said brake means so as to variably brake a selected one or ones of said wheels in order to apply the calculated value of the yaw moment to the vehicle body.

2. A behavior control device according to claim 1, wherein said control means modifies said calculation of the value of the yaw moment with a change rate of said slip angle such that the calculated value of the yaw moment applied to the vehicle body is increased according to an increase of said change rate coincident with a change of said slip angle.

3. A behavior control device according to claim 1, further comprising:

means for calculating a liability of the vehicle body to spin for producing a spin value which generally increases along with an increase of the spin liability;

means for calculating a liability of the vehicle body to drift-out for producing a drift-out value which generally increases along with an increase of the drift-out liability;

wherein said control means modifies said yaw moment applied to the vehicle body according to at least one of said spin value and said drift-out value such that said yaw moment applied to the vehicle body is greater as said spin value or said drift-out value is greater.

4. A behavior control device according to claim 3, wherein said spin liability calculating means includes means for calculating a point in the vehicle body at which slip angle of the vehicle body is generally minimum, and estimates said spin liability at said point.

5. A behavior control device according to claim 3, wherein said drift-out liability calculating means includes means for calculating a point in the vehicle body at which slip angle of the vehicle body is generally minimum, and calculates said drift-out liability at said point.

6. A behavior control device according to claim 4, wherein said drift-out liability calculating means calculates said drift-out liability at said point.

7. A behavior control device according to claim 3, wherein said control means combines said spin liability and said drift-out liability to provide a total instability liable factor for said modification of said yaw moment, such that said total instability liable factor emphasizes said spin liability more than said drift-out liability when said spin liability is greater than said drift-out liability and vice versa.

8. A behavior control device according to claim 3, wherein said control means adopts said spin liability for said modification of said yaw moment when said spin liability is greater than said drift-out liability, while said control means adopts said drift-out liability for said modification of said yaw moment when said drift-out liability is greater than said spin liability.

9. A behavior control device according to claim 1, wherein said control means calculates said yaw moment such as to assist turn of the vehicle along a curved course when said detected slip angle is smaller than said calculated target slip angle, while said control means calculates said yaw moment such as to suppress turn of the vehicle along a curved course when said detected slip angle is greater than said calculated slip angle.

10. A behavior control device according to claim 9, wherein said control means calculates said vehicle turn suppressing yaw moment to increase at a higher rate than said vehicle turn assisting yaw moment relative to increase of said slip angle detected by said slip angle detecting means.

11. A behavior control device according to claim 1, further comprising means for detecting yaw rate of the vehicle body, and means for calculating a target value of yaw rate of the vehicle body, wherein said control means includes a first yaw moment calculating means for calculating a first component of said value of yaw moment to be applied to the vehicle body and a second yaw moment calculating means for calculating a second component of said value of yaw moment to be applied to the vehicle body such that, when a yaw moment composed of a first share of said first calculated component of yaw moment and a second share of said second calculated component of yaw is applied to the vehicle body, the slip angle detected by said slip angle detecting means conforms to said target value thereof calculated by said target slip angle calculation means, while the yaw rate detected by said yaw rate detecting means conforms to said target value thereof calculated by said target yaw rate calculation means.

12. A behavior control device according to claim 11, wherein said control means controls said first and second shares to be complementary to one another such that said first share is increased while said second share is decreased according to an increase of an absolute value of a spin value.

13. A behavior control device according to claim 1, further comprising means for calculating friction coefficient of road surface, wherein said control means modifies said yaw moment applied to the vehicle body according to said friction coefficient such that said yaw moment applied to the vehicle body is greater as said friction coefficient is greater.

* * * * *